United States Patent Office 2,845,927
Patented Aug. 5, 1958

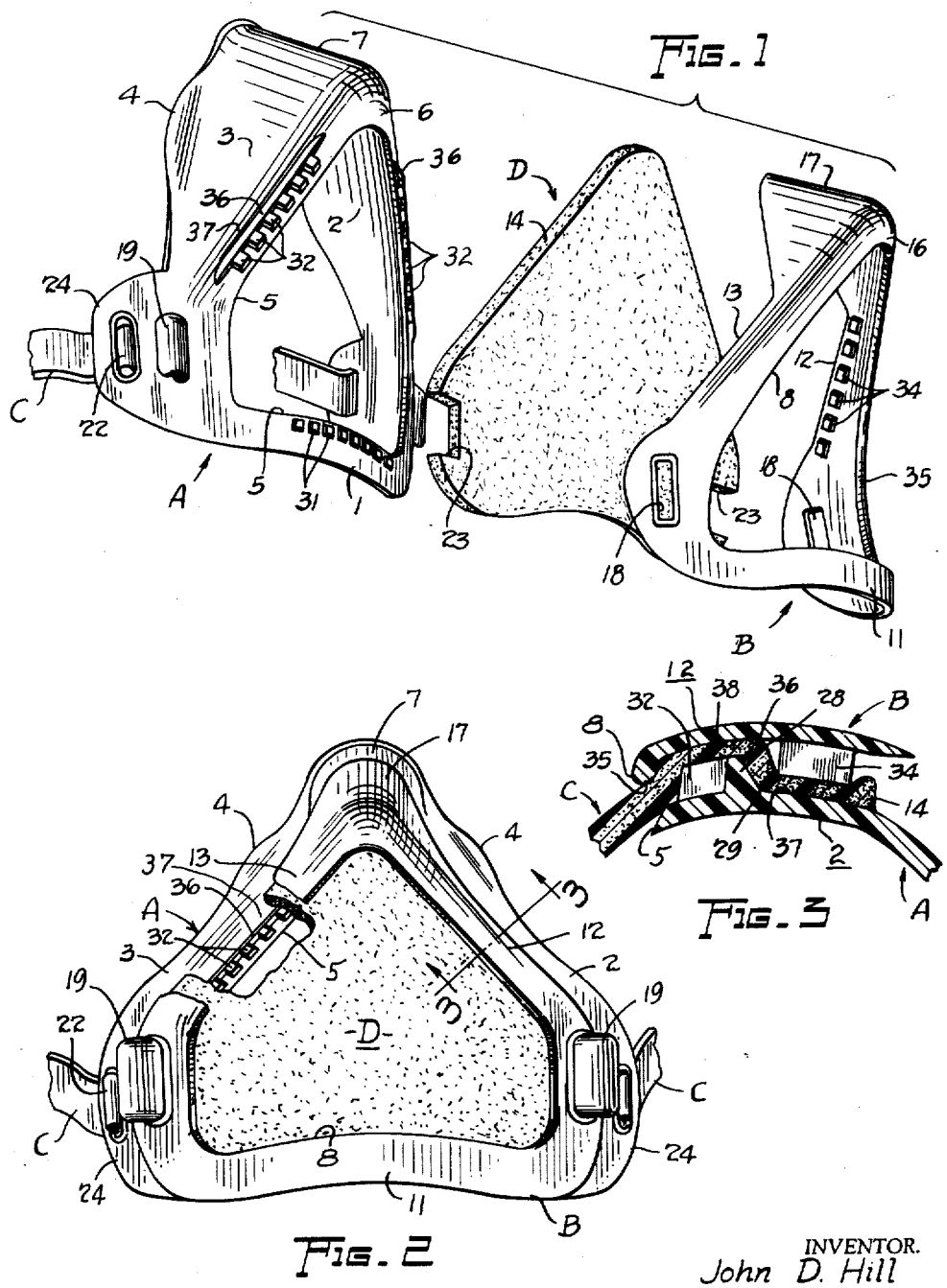

2,845,927
RESPIRATOR WITH INTEGRAL RIB FOR CLAMPING FILTER ELEMENT AND SEALING BREATHING OPENING

John D. Hill, Rocky River, Ohio, assignor to Flexo Products, Incorporated, Cleveland, Ohio, a corporation of Ohio Application April 30, 1957, Serial No. 656,031

5 Claims. (Cl. 128—146)

This invention relates to a mask type respirator of the type in which an air filtering element is marginally clamped between interfitted frame members, one frame member being formed and adapted to be disposed against and conform to the face of the wearer. More particularly, the invention is concerned with such a respirator in which the frame members are of resilient plastic material formed as by injection molding.

One of the principal objectives of the invention is to provide improvements in the type of mask disclosed in my prior United States Patent No. 2,578,007 issued December 11, 1951, to the end that the plastic frames maintain a more effective seal and a better grip on those side portions of the filter element that are disposed along the cheeks of the wearer. Reference is also made to my copending application for patent on Respirator Mask, Serial No. 427,106, filed May 3, 1954, describing and claiming common subject matter.

Another object is to provide a respirator of molded plastic frames in which the labial or cheek portions of one of the interfitted frames are reinforced by upstanding rib elements that not only resist objectionable bending and distortion of the frame in use but are also effective in gripping the respirator filter element edges and sealing the filter element along the side frame elements of the frame members. The invention contemplates the provision of specialized filter holding and sealing and frame reinforcing formations on the labial portions of at least one of the respirator parts. More specifically it is contemplated to provide a number of teeth or protuberances in combination with an integral tooth linking rib on one of the respirator parts, the teeth and the rib being so positioned as to bite into or become embedded in the margin of the filter element. In the best version presently known, a series of spaced protuberances or teeth are formed on the confronting surfaces of each of the respirator parts, the teeth of the underlying series being linked by an integral upstanding rib which seals the spaces between the teeth.

The filter holding teeth are arranged in rows extending in lines substantially paralleling the margins of the frame members of the respirator that define the breathing opening. The row or rows of teeth on the inner or underlying frame member are connected by the integral rib and are closer to the breathing opening than are the associated row or rows of teeth on the outer or overlying confronting frame member so that the rib connected teeth of the inner frame member engage the filter element relatively close to the breathing opening, the teeth on the outer frame member engaging the filter element at a greater distance from the breathing opening and holding the filter against the sealing rib.

Other objects and advantages relate to certain structural details and combinations of parts as set forth in the following detailed description of a preferred embodiment of the invention which represents the best known mode of practicing its principles. This description is made in connection with the accompanying drawings forming a part of the specification.

In the drawing:

Fig. 1 is an expanded view, with parts broken away and removed, showing the principal components of the respirator in perspective;

Fig. 2 is a front view of the respirator, partly in section and with parts broken away and removed, this view showing the several components assembled together; and Fig. 3 is a sectional detail taken in the plane represented by the line 3—3 of Fig. 2 and enlarged with respect to that figure.

The respirator comprises inner and outer frame members A and B, respectively, an attaching head band C of elastic material such as rubber and a porous filter element D. The frame members are formed of resilient shape-retaining material, being of generally thin section and yieldable so as to conform to varying facial contours of different persons while being capable of resuming their natural molded shapes after each use. For example, the frame members shown are formed as by injection molding of a thermoplastic material such as polyethylene which, in addition to its desirable characteristics of resilience and durability, is neutral and therefore will not irritate the skin of the wearer.

The inner frame member A is generally triangular in shape and is cupped to receive the nose and mouth of the wearer. It comprises a horizontal portion 1 which extends across and rests against the chin of the wearer. Side or cheek portions 2 and 3 are oblique or at an acute angle to bottom portion 1 and are curved rearwardly away from the bottom portion so as to overlie the cheeks of the wearer. The side portions are tapered and generally of greater width than the chin portion 1 and are integrally joined together by top portion 7 which overlies the nose of the wearer. The bottom and side portions of the inner member A thus define an inverted heart or V shaped breathing opening 5 across which is disposed filter element D. The inner frame member A includes a front portion 6 curved downwardly from the top or bridge portion 7 and disposed across the top of the breathing opening. The front portion 6 is integrally joined to the rearwardly extending top 7 which, with the side portions 2 and 3, provides an enclosing bridge for the wearer's nose. The rear edges of the oblique sides 2 and 3 are formed with outwardly curving integral tab portions 4 that fit in the angles between the wearer's nose and cheeks. These tabs are generally thinner than the sides and other parts of the frame member A, thus being more flexible to obtain the desired yielding and conforming comfortable fit. The filter element D is a mat or pad of any suitable porous material in the form of woven gauze of cotton or other fiber, or felted mat of fibrous glass, natural or synthetic fiber or combination thereof, or it may be terry cloth, natural or artificial sponge, foam latex or a poly urethane foam.

The outer frame member B is complementally shaped with respect to the inner frame member A but is of less area or extent than the latter. Breathing opening 8 in the outer frame member B corresponds in shape to the breathing opening 5 of the inner frame member.

The outer frame member includes chin, oblique side and top front portions 11, 12, 13 and 16 corresponding respectively to the portions 1, 2, 3 and 6 of the inner frame member A. These corresponding portions of the inner and outer frame members are complementally shaped and adjacent the breathing openings 5, 8 have confronting faces which clamp between them marginal portions 14 of the filter element D around the entire periphery of the latter.

Along the upper edge of the top front portion 16 of the outer frame member is formed an integral angularly disposed and rearwardly extending flange 17 which is arranged to overlie the nasal bridge or arch 7 of the inner frame member to locate and hold the two frame members in predetermined relative positions and to support the outer frame member on the inner.

The front portion 16 and the nasal bridge portion 17 of the outer member B cooperatively define a relatively large pocket 15 that locatingly receives a complemental part of the inner member comprising the front and nasal bridge portions 6 and 7 respectively.

At each side of the mask respirator the side portions 12 and 13 of the outer frame member are formed adjacent their rearmost ends with vertically elongated openings 18 which receive laterally projecting extensions or horns 19 formed integrally on the adjacent side portions 2 and 3 of the inner frame member A. The rearmost side edges of the generally triangular filter element D are notched out as indicated at 23 in the provision of locating recesses that receive the horns 19.

The headband C is in the form of an adjustable length flexible strap or tape preferably comprising elastic strip rubber to retain the respirator frame snugly against the wearer's face. In assembling the respirator the ends of a suitable adjustable length elastic rubber band or tape C are threaded through openings 20 in rearwardly extending integral tabs 24 of the inner part side portions 2 and 3. The rubber band ends have integral enlargements or knobs 22 which are shaped and sized to permit insertion through the slots 20 in assembly but resist withdrawal in normal use.

Augmentation of the grip of the frame members on the filter element D is obtained by a combination of integral ribs and square shaped teeth extending along the confronting surfaces of the members adjacent the openings 5, 8. A series of teeth 31 are formed on the outwardly directed face of the chin portion 1 of the frame member A. These teeth are arranged in a row paralleling and relatively close to the edge of the inner member defining the breathing opening 5. Similar teeth 32 are arranged in lines along the oblique side portions 2 and 3 of the inner member parallel to and relatively close to the edges of the side portions which define the breathing opening. The teeth 31 and 32 project toward the confronting internal surfaces of the corresponding chin and side portions of the outer frame part B and the latter is formed with inwardly directed teeth (not shown) on the chin portion 11 and inwardly directed teeth 34 on the oblique side portions 12 and 13. The rows of teeth 34 are spaced farther from the breathing opening than are the corresponding or companion teeth 32 of the inner member so that the rows of teeth on the two frame members being laterally offset from and parallel to one another, form a wave comprising bends 28, 29 (Fig. 3) in the filter element D parallel to its edges. The clamping teeth are discontinuous across the junctures between the bottom chin portions or elements of the frames and the adjacent oblique side portions or elements and also across the junctions at the top nasal bridges between such side portions or elements.

An integral endless bead 35 is formed on the outer member B and extends unbroken about the entire breathing opening 8. This bead projects inwardly or into the plane of the opening and is engaged against the outward surface of the filter element.

The side portions or elements 2 and 3 of the inner frame member A, integrally connected at their lower ends to the opposite ends of the bottom element 1 and inclined toward one another, curve rearwardly and progressively increase in width toward the top of the respirator where they are integrally joined together to form the nasal bridge 7 and the top frontal portion 6. They are formed with integral upstanding ribs 36 adjacent but spaced from their forward frame edges which defines the breathing opening 5. Each of these ribs is normal to outwardly directed surface portion 37 of the inner frame member A on which is formed and which confronts a companion inwardly directed surface portion 38 of the outer frame B. As shown to advantage in Figure 3 the upstanding rib 36 on the side element 2 of the inner frame member A lies between the line of the teeth 34 and the beaded edge 35 on the side element 12 of the outer member B when the respirator is assembled. Similarly in the assembled device, the rib 36 on the side element 3 of the inner frame member A lies between the line of the teeth and the beaded edge 35 of the confronting companion portion of the outer frame side element 13.

The ribs 36 as well as the teeth 32 of the inner frame are thus offset laterally toward the registered breathing openings of the frame members with respect to the lines of the inwardly directed teeth or protuberances 34 of the outer frame. This arrangement has the effect of placing the bends 28 of the clamped filter element C about or over the crests or tops of the upstanding ribs 36. The tooth protuberances 32, being wholly on that side of each of the respective ribs 36 which is directed forwardly toward the breathing opening, leave the other or rearwardly directed surfaces of the ribs smooth and unobstructed for effecting sealing engagement with the inside surface of the filter C along lines spaced from the breathing opening. The sealing lines of the rib edges against the filter C are, however, spaced toward the breathing opening from the lines of the outside teeth or protuberances 34 which thus hold the filter against the sealing rib crests. Thus effective seals are provided between the inside of the filter C and the side portions of the inner frame member A preventing ingress of air between the filter and the frame member when the respirator is in use.

As shown in Figure 1 the sealing ribs 36 integrally connect the individual biting teeth 32 which extend along the major portions of each of the inner frame side elements 2 and 3. The sealing ribs 36 as well as the teeth are discontinuous across the top frontal portion 6 of the inner frame and across the lower portions of the side elements 2 and 3 since at such regions the relatively wide areas of contact between the filter element and the outside surface of the inner frame member are effective to clamp the filter and maintain adequate seals. The teeth 31 across the chin element 1 of the inner frame member may be supplemented by an integrally connected sealing and reinforcing rib (not shown) disposed wholly below such teeth so that the teeth 31 intervene between the sealing rib and the frame edge definitive of the breathing opening 5, all similarly to the combination of the ribs 36 and the filter biting and clamping teeth 32 used along the major portions of the inner side frame elements 2, 3. It is understood, of course, that the bottom element 11 of the outer frame B has a series of teeth integrally formed on and projecting from its inside surface toward the confronting outwardly directed surface of the inner frame element 1. The cooperating teeth of the bottom elements of the frames are related to one another and to the breathing opening edges of the frame elements in the same way the teeth and the frame elements in Fig. 3 are related.

In addition to their function as a sealing factor between the inner frame member and the filter C, the ribs 36 reinforce those portions of the side frame elements 2, 3 adjacent the breathing opening. This reinforcement prevents objectionable bending of those portions of the inner frame side elements which border the breathing opening when the respirator is stressed in use by the tension in the head band C.

To change or replace the filter D while the respirator is being worn, the user draws outwardly on one or both of the side portions 12 and 13 of the outer frame member adjacent the horn receiving openings 18 to release the snap fit interlock of the horns 19. The outer frame member B is thus released from the inner frame member A, allowing the latter to remain in position over the wearer's nose and mouth. With the frame members thus separated the filter element D is released from clamped position between the confronting faces of the frame members, permitting it to be removed or withdrawn from the breathing opening in the front of the mask. With the outer frame member still withdrawn a new or replacement filter is then disposed across the breathing opening 5 of the inner frame member and the outer frame member is returned to clamping position. The holding horns 19 are locatingly received in the notches 23 of the filter element D. The frames may also be separated by relatively springing apart the side portions of the inner and outer frame member to withdraw them from off the extensions or horns 19, thus releasing the frame members from their clamping engagement on the filter element.

In accordance with the provisions of the patent statutes, the principles of the present invention may be utilized in various ways, numerous modifications and alterations being contemplated, substitution of parts and changes in construction being resorted to as desired, it being understood that the embodiment shown in the drawing and illustrated above is given merely for the purposes of explanation and illustration without intending to limit the scope of the claims to the specific details disclosed.

What I claim and desire to secure by Letters Patent of the United States is:

1. A mask type respirator device receivable over the nose and mouth of a wearer, said respirator comprising separable inner and outer frame members of resilient plastic material nested together, the frame members each being formed with a front breathing opening registered with the breathing opening of the other, each frame member having a bottom element for disposition across the chin of the wearer and side elements integrally connected at their lower ends to the spaced ends of the bottom chin element, the side elements of each frame member being inclined toward one another and integrally connected together at the top of the device, a filter of deformable material disposed and peripherally clamped between the frame members and extending across the registered breathing openings, a band connected to one of the members for encircling the head of the wearer and holding the device in place over the wearer's nose and mouth, the elements of the inner and outer members having respectively outwardly and inwardly directed surfaces bordering the breathing opening, such outwardly directed surfaces of the inner member being disposed in confronting relation to the corresponding inwardly directed surfaces of the outer member so as to be disposed on opposite sides of a clamped filter, the members each being formed with integral spaced protuberances on the confronting surfaces to bite into the filter, the protuberances on one member being laterally offset relative to those on the other member whereby to effect a bending of the filter periphery, and at least one of the elements of the inner member having an integral upstanding narrow rib paralleling that edge of such inner element which defines the breathing opening therein, said rib extending between and integrally connecting a plurality of the protuberances of such inner element whereby the rib constitutes a seal preventing leakage of air between the inner member and the filter adjacent the points of engagement between the filter and those protuberances connected by the rib.

2. A mask type respirator device receivable over the nose and mouth of a wearer, said respirator comprising separable inner and outer frame members of resilient plastic material nested together, the frame members each being formed with a front breathing opening registered with the breathing opening of the other, each frame member having a bottom element for disposition across the chin of the wearer and side elements integrally connected at their lower ends to the spaced ends of the bottom chin element, the side elements of each frame member being inclined toward one another and integrally connected together at the top of the device, a filter of deformable material disposed and peripherally clamped between the frame members and extending across the registered breathing openings, a band connected to one of the members for encircling the head of the wearer and holding the device in place over the wearer's nose and mouth, the elements of the inner and outer members having respectively outwardly and inwardly directed surfaces bordering the breathing opening, such outwardly directed surfaces of the inner member being disposed in confronting relation to the corresponding inwardly directed surfaces of the outer member so as to be disposed on opposite sides of a clamped filter, the members each being formed with integral spaced protuberances on the confronting surfaces to bite into the filter, the protuberances on the inner member including along at least one of its elements a series along a line closer to the registered breathing openings than the corresponding protuberances on the confronting surface of the outer member whereby a marginal edge portion of the filter is bent inwardly by such corresponding protuberances of the outer member along and about the line of the series on the inner member, the inner member being formed with an integral upstanding rib paralleling the series of protuberances, and said rib being engaged throughout its length by the inside surface of the filter in the provision of a seal between the inner member and the filter along a line spaced outwardly from the surface of the inner member on which the series of protuberances are formed.

3. A mask type respirator device receivable over the nose and mouth of a wearer, said respirator comprising separable inner and outer frame members of resilient plastic material nested together, the frame members each being formed with a front breathing opening of the other, each frame member having a bottom element for disposition across the chin of the wearer and side elements integrally connected at their lower ends to the spaced ends of the bottom chin element, the side elements of each frame member being inclined toward one another and integrally connected together at the top of the device, a filter of deformable material disposed and peripherally clamped between the frame members and extending across the registered breathing openings, a band connected to one of the members for encircling the head of the wearer and holding the device in place over the wearer's nose and mouth, the elements of the inner and outer members having respectively outwardly and inwardly directed surfaces bordering the breathing opening, such outwardly directed surfaces of the inner member being disposed in confronting relation to the corresponding inwardly directed surfaces of the outer member so as to be disposed on opposite sides of a clamped filter, the members each being formed with integral spaced protuberances on the confronting surfaces to bite into the filter, the protuberances on the inner member including along at least one of its elements a series along a line closer to the registered breathing openings than the corresponding protuberances on the confronting surface of the outer member whereby a marginal edge portion of the filter is bent inwardly by such corresponding protuberances of the outer member along and about the line of the series on the inner member, the inner member being formed with an upstanding rib connecting and integral with the protuberances of said series, and said rib being engaged throughout its length by the inside surface of the filter in the provision of a seal between the inner member and the filter along a line spaced outwardly from the surface of the inner member on which the series of protuberances are formed.

4. A mask type respirator device receivable over the nose and mouth of a wearer, said respirator comprising separable inner and outer frame members of resilient plastic material nested together, the frame members each being formed with a front breathing opening of the other, each frame member having a bottom element for disposition across the chin of the wearer and side elements integrally connected at their lower ends to the spaced ends of the bottom chin element, the side elements of each frame member being inclined toward one another and integrally connected together at the top of the device, a filter of deformable material disposed and peripherally clamped between the frame members and extending across the registered breathing openings, a band connected to one of the members for encircling the head of the wearer and holding the device in place over the wearer's nose and mouth, the elements of the inner and outer members having respectively outwardly and inwardly directed surfaces bordering the breathing opening, such outwardly directed surfaces of the inner member being disposed in confronting relation to the corresponding inwardly directed surfaces of the outer member so as to be disposed on opposite sides of a clamped filter, the members each being formed with integral spaced protuberances on the confronting surfaces to bite into the filter, the protuberances on the inner member including along at least one of its elements a series along a line closer to the registered breathing openings than the corresponding protuberances on the confronting surface of the outer member whereby a marginal edge portion of the filter is bent inwardly by such corresponding protuberances of the outer member along and about the line of the series on the inner member, the inner member being formed with an upstanding rib connecting and integral with the protuberances of said series, the protuberances of said series being located wholly on that side of the rib toward the breathing opening, the other side of the rib presenting a smooth and unbroken surface for engagement by the filter, and said rib being engaged throughout its length by the inside surface of the filter in the provision of a seal between the inner member and the filter along a line spaced outwardly from the surface of the inner member on which the series of protuberances are formed.

5. A mask type respirator device receivable over the nose and mouth of a wearer, said respirator comprising separable inner and outer frame members of resilient plastic material nested together, the frame members each being formed with a front breathing opening of the other, each frame member having a bottom element for disposition across the chin of the wearer and side elements integrally connected at their lower ends to the spaced ends of the bottom chin element, the side elements of each frame member being inclined toward one another and integrally connected together at the top of the device, a filter of deformable material disposed and peripherally clamped between the frame members and extending across the registered breathing openings, a band connected to one of the members for encircling the head of the wearer and holding the device in place over the wearer's nose and mouth, the elements of the inner and outer members having respectively outwardly and inwardly directed surfaces bordering the breathing opening, such outwardly directed surfaces of the inner member being disposed in confronting relation to the corresponding inwardly directed surfaces of the outer member so as to be disposed on opposite sides of a clamped filter, the members each being formed with integral spaced protuberances on the confronting surfaces to bite into the filter, the protuberances on the inner member including along at least one of its elements a series along a line closed to the registered breathing openings than the corresponding protuberances on the confronting surface of the outer member whereby a marginal edge portion of the filter is bent inwardly by such corresponding protuberances of the outer member along and about the line of the series on the inner member, the inner member being formed with an upstanding rib connecting and integral with the protuberances of said series, the protuberances of said series being located wholly on that side of the rib toward the breathing opening, the other side of the rib presenting a smooth and unbroken surface for engagement by the filter, and the rib being disposed in a plane generally normal to said surface of the inner member, the line of the series of protuberances on the inner member being on one side of the plane and said outer member corresponding protuberances being disposed to engage the outside surface of the filter along a line on the other side of such plane whereby the clamped filter is deformed to S shape in section along its margins disposed between the side elements of the frames and the edge of the upstanding sealing rib is engaged against a concave portion of the inside surface of the filter in the establishment of a line contact seal.

References Cited in the file of this patent

UNITED STATES PATENTS

| 2,578,007 | Hill | Dec. 11, 1951 |
| 2,751,904 | Lewis | June 26, 1956 |

UNITED STATES PATENT OFFICE

CERTIFICATE OF CORRECTION

Patent No. 2,845,927

August 5, 1958

John D. Hill

It is hereby certified that error appears in the printed specification of the above numbered patent requiring correction and that the said Letters Patent should read as corrected below.

Column 8, line 19, for "closed" read -- closer --.

Signed and sealed this 22nd day of March 1960.

(SEAL)
Attest:

KARL H. AXLINE
Attesting Officer

ROBERT C. WATSON
Commissioner of Patents